US012403917B2

(12) United States Patent
Meyer et al.

(10) Patent No.: US 12,403,917 B2
(45) Date of Patent: *Sep. 2, 2025

(54) CALIBRATION APPARATUS FOR OFFSET VEHICLE SENSOR

(71) Applicant: Robert Bosch GmbH, Stuttgart (DE)

(72) Inventors: Weston Meyer, Minneapolis, MN (US); Scott Bartkowiak, Novi, MI (US)

(73) Assignees: Bosch Automotive Service Solutions, Inc., Warren, MI (US); Robert Bosch GmbH, Stuttgart (DE)

( * ) Notice: Subject to any disclaimer, the term of this patent is extended or adjusted under 35 U.S.C. 154(b) by 558 days.

This patent is subject to a terminal disclaimer.

(21) Appl. No.: 17/550,772

(22) Filed: Dec. 14, 2021

(65) Prior Publication Data
US 2023/0166745 A1 Jun. 1, 2023

Related U.S. Application Data

(60) Provisional application No. 63/283,734, filed on Nov. 29, 2021.

(51) Int. Cl.
*B60W 50/02* (2012.01)
*G01S 7/40* (2006.01)
*G01S 7/497* (2006.01)
*G06V 10/75* (2022.01)
*B60W 50/00* (2006.01)

(52) U.S. Cl.
CPC .... *B60W 50/0205* (2013.01); *B60W 50/0225* (2013.01); *G01S 7/40* (2013.01); *G01S 7/497* (2013.01); *G01S 7/4972* (2013.01); *G06V 10/751* (2022.01); *B60W 2050/0085* (2013.01); *B60W 2050/0215* (2013.01)

(58) Field of Classification Search
CPC . B60W 2050/0085; B60W 2050/0215; B60W 50/0205; B60W 50/0225; G01S 13/931; G01S 17/931; G01S 7/40; G01S 7/4086; G01S 7/497; G01S 7/4972; G06V 10/751; G06V 20/52

See application file for complete search history.

(56) References Cited

U.S. PATENT DOCUMENTS 10,692,241 B2 * 6/2020 Kunert ................... H04N 23/90
11,279,327 B1 * 3/2022 Jackson, Jr. .......... G01S 7/4972
11,597,091 B2 * 3/2023 Lawrence ............. G01S 7/4972
(Continued)

FOREIGN PATENT DOCUMENTS

EP            3608687 B1 *  4/2022  ............. G01B 11/27
WO   WO-2020000297 A1 *  1/2020  ............. B60W 50/10
WO   WO-2020135572 A1 *  7/2020  ............. G01B 11/272

*Primary Examiner* — Andre J Allen
(74) *Attorney, Agent, or Firm* — David Kovacek

(57) ABSTRACT

A calibration apparatus and method suitable for calibration of an offset sensor of a subject vehicle. The calibration apparatus comprises a reference structure that is placed into, a reference locus using image data generated by a camera associated with the reference structure. An offset-target structure is then placed into position by coupling the offset-target structure to the reference structure, the coupling providing an appropriate locus for the offset-target structure during calibration of the offset sensor. The coupling restricts the linear and rotational displacement of the offset-target structure during calibration.

16 Claims, 7 Drawing Sheets

(56) References Cited

U.S. PATENT DOCUMENTS

2023/0168113 A1* 6/2023 Myer ................. G01D 21/00
　　　　　　　　　　　　　　　　　　　　　73/1.01
2023/0391295 A1* 12/2023 Jackson, Jr. ........ G01S 7/52004

* cited by examiner

CALIBRATION APPARATUS FOR OFFSET VEHICLE SENSOR

TECHNICAL FIELD

This disclosure relates to the calibration of vehicular sensors and an associated apparatus used for the calibration thereof.

BACKGROUND

Advanced driver assistance (ADAS) functions of modern vehicles are becoming more robust and complex. ADAS functions of vehicles rely upon an array of sensors arranged around the vehicle to monitor the environmental and traffic conditions the vehicle is subjected to. Calibration of these sensors is critical to ensure proper and safe operation of the ADAS functions of the associated vehicle. Specialized calibration apparatuses have been utilized to provide calibration of the sensors associated with ADAS functions.

Existing calibration apparatuses are often bulky, unwieldly, and rely upon controlled environments and repeated measurements with respect to the subject vehicle to find their appropriate placement for a successful calibration. It would be desirable for a calibration apparatus that was functional with a minimized number of measurements in order to expedite the setup process and streamline calibration, even in field environments.

SUMMARY

One aspect of this disclosure is directed to a calibration apparatus for an offset sensor of a subject vehicle. The apparatus may comprise a reference structure having a horizontal member, the horizontal member disposed in a direction substantially parallel with a horizontal plane, a camera configured to be coupled to the reference structure and operable to generate image data depicting the subject vehicle, and an offset-target structure having a guide arm and configured to be detachably couple to the horizontal member such that the guide arm interfaces with the horizontal member. The calibration apparatus may be configured for a calibration procedure of the offset sensor when the wheel-target structure is coupled to a wheel of the subject vehicle, the reference structure is positioned relative to the subject vehicle based upon image data generated by the camera, and the offset-target structure is coupled to the horizontal member. Some embodiments may additionally comprise a wheel-target structure configured to detachably couple to a wheel of the subject vehicle.

Another aspect of this disclosure is directed to a method for placing an offset-target structure into a locus suitable for calibration of an offset sensor of a subject vehicle, the offset-target structure having a guide arm. The method comprises positioning a reference structure into a reference locus and coupling the offset-target structure to the reference structure such that the guide arm interfaces with the horizontal member. In some embodiments, the method may additional comprise detachably coupling a wheel-target structure to a wheel of the subject vehicle. The reference structure may have a horizontal member and a camera. The guide arm restricts the motion of the offset-target structure with respect to pitch, yaw, or roll when the offset-target structure is coupled to the reference structure. The reference locus may be defined in relation to the subject vehicle. In the method, the reference locus is found using image data generated by the camera while the wheel-target structure is coupled to the wheel.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
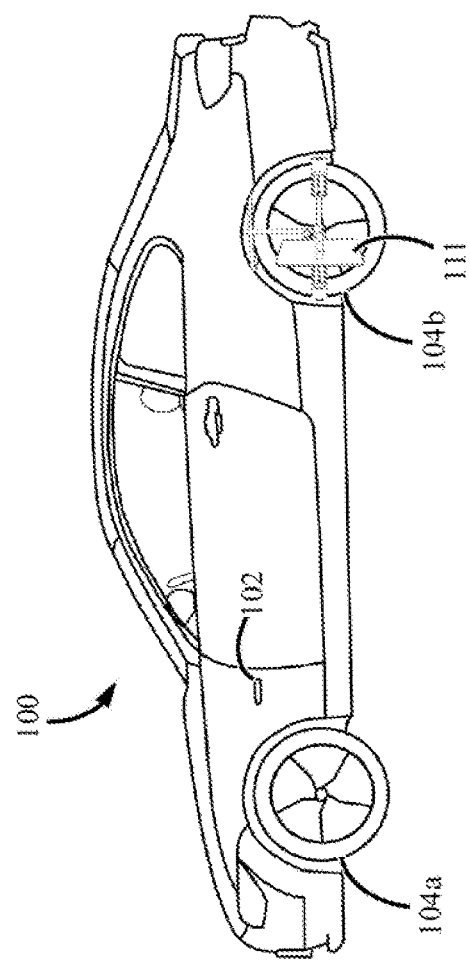
FIG. 1 is an illustration of a subject vehicle during a calibration procedure for an offset sensor of the subject vehicle.
Figure 1:
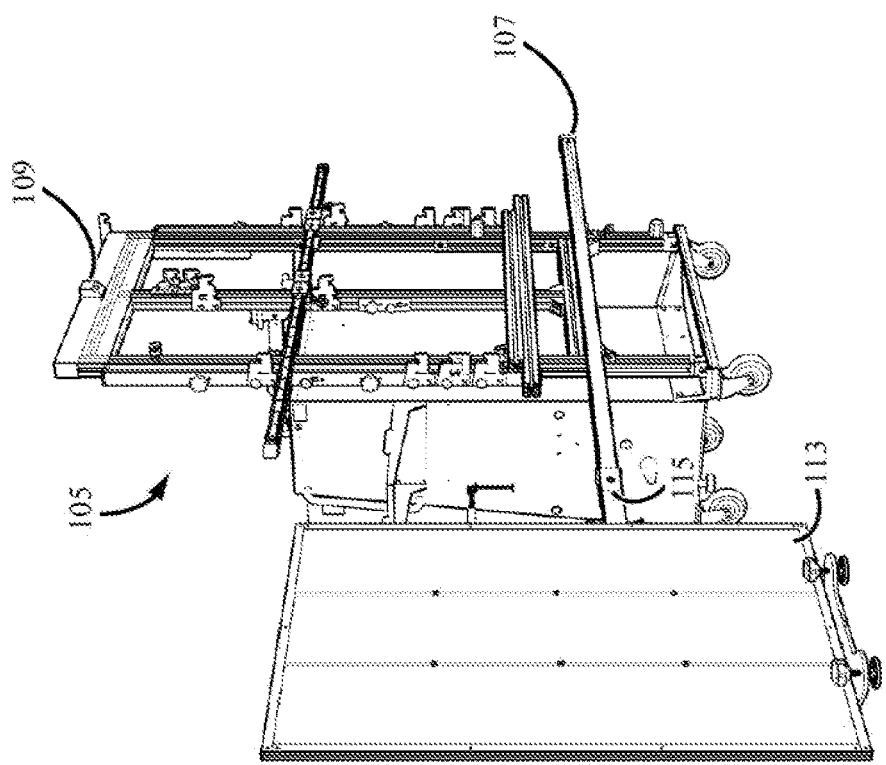

FIG. 1 depicts a vehicle 100 acting as a subject vehicle of a calibration procedure directed to an offset sensor 102 associated with the vehicle. In the depicted embodiment, vehicle 100 may comprise additional sensors in addition to offset sensor 102. The sensors available to vehicle 100 may comprise front, rear, or side sensors arranged to detect objects or environmental conditions in a direction perpendicular or parallel to the normal forward motion of vehicle 100. In contrast, offset sensor 102 may be configured to detect objects or environmental conditions at oblique angles with respect to the normal forward motion of vehicle 100 or the perpendicular direction thereto. Examples of offset sensors may comprise lane-change sensors, blind-spot sensors, lane detection sensors, or any other offset sensor known to one of ordinary skill in the art without deviating from the teachings disclosed herein. In the depicted embodiment, offset sensor 102 comprises a lane-change sensor, but other embodiments may comprise additional or different offset sensors without deviating from the teachings disclosed herein. The sensors of vehicle 100, such as offset sensor 102, may comprise known types, such as image sensors, camera sensors, optical sensors, radar sensors, lidar sensors, proximity sensors, motion sensors, or any other vehicular sensor known to one of ordinary skill in the art without deviating from the teachings disclosed herein. By way of example, and not limitation, the depicted embodiment comprises a configuration of offset sensor 102 comprises an optical sensor, but other embodiments may comprise other configurations without deviating from the teachings disclosed herein.

Vehicle 100 additionally comprises a number of wheels 104. In previous calibration techniques, placement of the wheels were utilized with respect to another calibration apparatus. In the depicted embodiment, each of the components of the calibration apparatus may positioned into loci suitable for calibration in relation to the vehicle. Advantageously, placement of the apparatus in relation to the vehicle permits a relatively arbitrary placement of the vehicle to be supported by the calibration apparatus. In an additional advantage, the various components of the calibration apparatus are simply and easier to move manually than vehicle 100, which typically must be driven into a particular position.

The calibration apparatus comprises a reference structure 105 having a horizontal member 107 and camera 109, a wheel-target structure 111, and an offset-target structure 113 having a guide arm 115. In the depicted embodiment, the camera 109 generates image data that is utilized to determine a reference locus for the reference structure 105. Wheel-target structure 111 is additionally utilized to provide a distinctive subset of image data to be utilized in the placement of reference structure 105. When the reference structure 105 is successfully positioned at its respective reference locus, offset-target structure 113 may be coupled to reference structure 105 by detachably coupling guide arm 115 and horizontal member 107. Offset-target structure 113 is designed according to a specification such that when it is coupled to reference structure 105, offset-target structure 113 is in a suitable offset locus for the calibration of offset sensor 102. Notably, the placement of reference structure 105 may utilized for the calibration of other sensors of vehicle 100, but its placement at the reference locus may be utilized to simply and efficiently place offset-target structure 113 without additional measurements beyond those already undertaken during placement of reference structure 105. This advantageously minimizes the setup requirements for the calibration apparatus. In the depicted embodiment, wheel-target structure 111 is mounted to rear wheel 104b, but other embodiments may utilize different mounting, such as to front wheel 104a. In other embodiments, the calibration apparatus may omit wheel-target structure 111 without deviating from the teachings disclosed herein. In the depicted embodiment, the calibration apparatus comprises a single reference structure 105 and a single offset-target structure 113, but other embodiments may comprise a different number of each of these components without deviating from the teachings disclosed herein. By way of example, and not limitation, an embodiment may comprise a plurality of offset-target structures 113, each of the offset-target structures placed on opposite ends of reference structure 105 in order to provide calibration targets for symmetrical offset sensors 102 on either side of vehicle 100.

Figure 2:
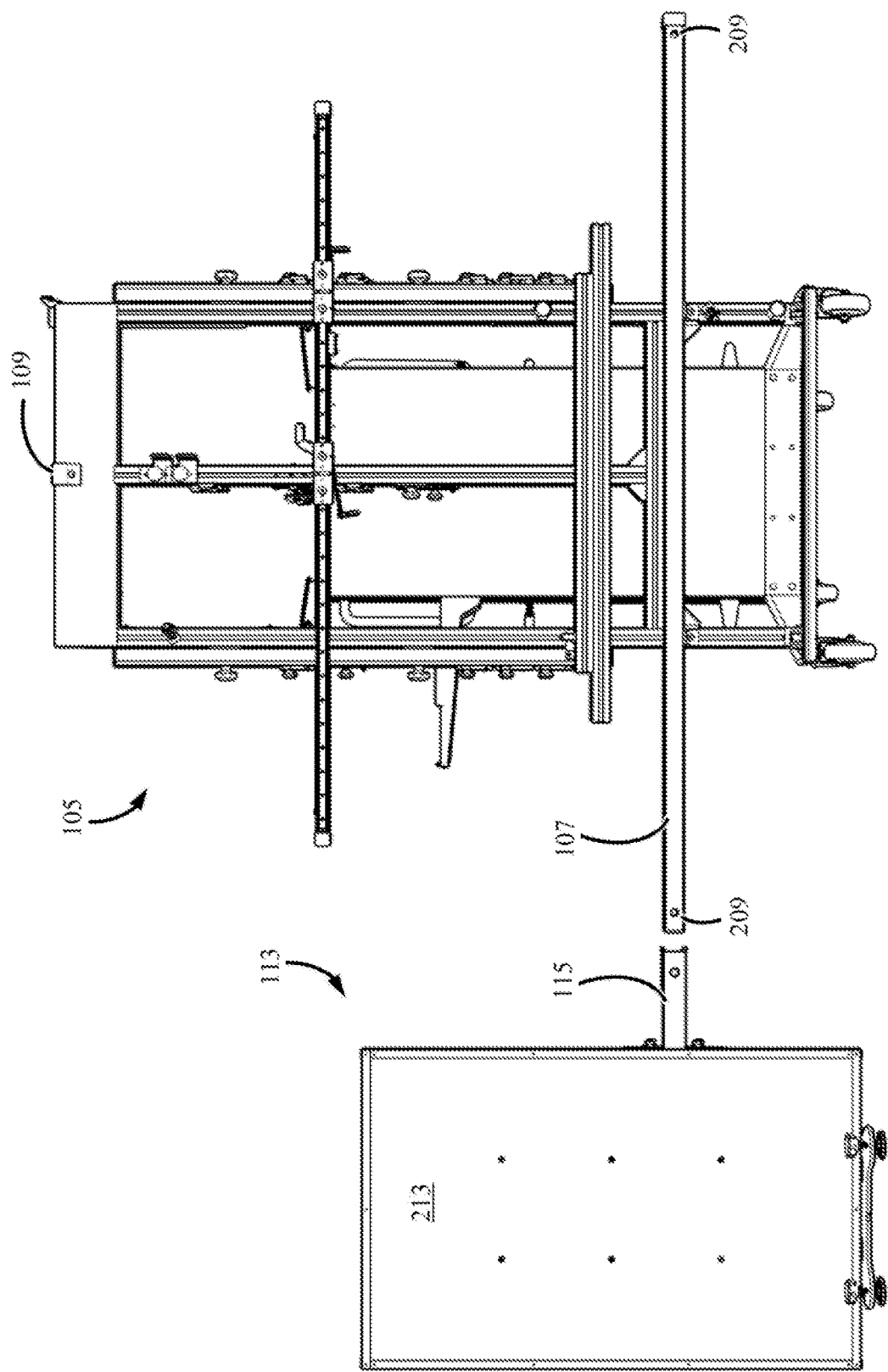
FIG. 2 is an illustration of a reference structure and an offset-target structure of a calibration apparatus for an offset sensor of a vehicle.

FIG. 2 depicts a view of reference structure 105 and offset-target structure 113 prior to detachable coupling of the two components. In the depicted embodiment, camera 109 is mounted near the top reference structure 105 and angled such that a downward view of a subject vehicle (e.g., vehicle 100, see FIG. 1) is acquired in the image data generated by camera 109. The generated image data may be sent to a display (not shown) and updated in real time as reference structure 105 is moved in relation to its subject vehicle. Use of the real-time update of image data advantageously permits a user to find the proper reference locus for reference structure 105 with a minimal number of measurements between reference structure 105 and its respective subject vehicle. When the reference structure 105 has been positioned into the appropriate reference locus, the depicted embodiment may comprise wheel locks suitable to temporarily lock the reference structure 105 into position at the reference locus.

In the depicted embodiment, horizontal member 107 is arranged on reference structure 105 near the bottom of the structure. In the depicted embodiment, horizontal member 107 may house a number of secondary cameras 209 that can be used to enhance, supplement, or replace the image data generated by camera 109. In the depicted embodiment, the placement of horizontal member 107 and arrangement of secondary cameras 209 is optimized to generate image data depicting wheel-target structure 111 (see FIG. 1). In the depicted embodiment, wheel-target structure 111 may be utilized to enhance the precision with which the reference structure 105 can be positioned at an appropriate reference locus. Some embodiments may not utilize one or more of secondary cameras 209 without deviating from the teachings disclosed herein.

Offset-target structure 113 is additionally shown to comprise a detachable target 213. Detachable target 213 may comprise one of several designs suitable for calibrating an offset sensor of different specifications. Advantageously, detachable target 213 may be detached from offset-target structure 113 and replaced with an alternatively-configured detachable target 213 to enhance the compatibility of the calibration apparatus with a greater variety of sensor specifications. In some embodiments, detachable target 213 may be constructed of desirable materials that optimize compatibility with a particular design of offset sensor. Detachable target 213 may comprise a rigid construction, such as metal, wood, or rigid plastics without deviating from the teachings disclosed herein. In some embodiments, detachable target 213 may comprise a malleable construction, such as textile fabric, plastic sheets, or polymers without deviating from the teachings disclosed herein. In the depicted embodiment, by way of example and not limitation, detachable target 213 comprises a vinyl mat target, which advantageously provides to a user a lightweight and portable target for the calibration apparatus. A vinyl mat target advantageously provides for an easy replication of a specified calibration design without sacrificing desired ruggedness for long-term use of the detachable target 213. A vinyl mat target additionally advantageously permits a user to easily store detachable target 213 when detached from offset-target structure 113 by rolling or folding the target when not in use. This ease of use and storage enhances the portability and flexibility in using the calibration apparatus, while also reducing costs for detachable target 113.

Figure 3:
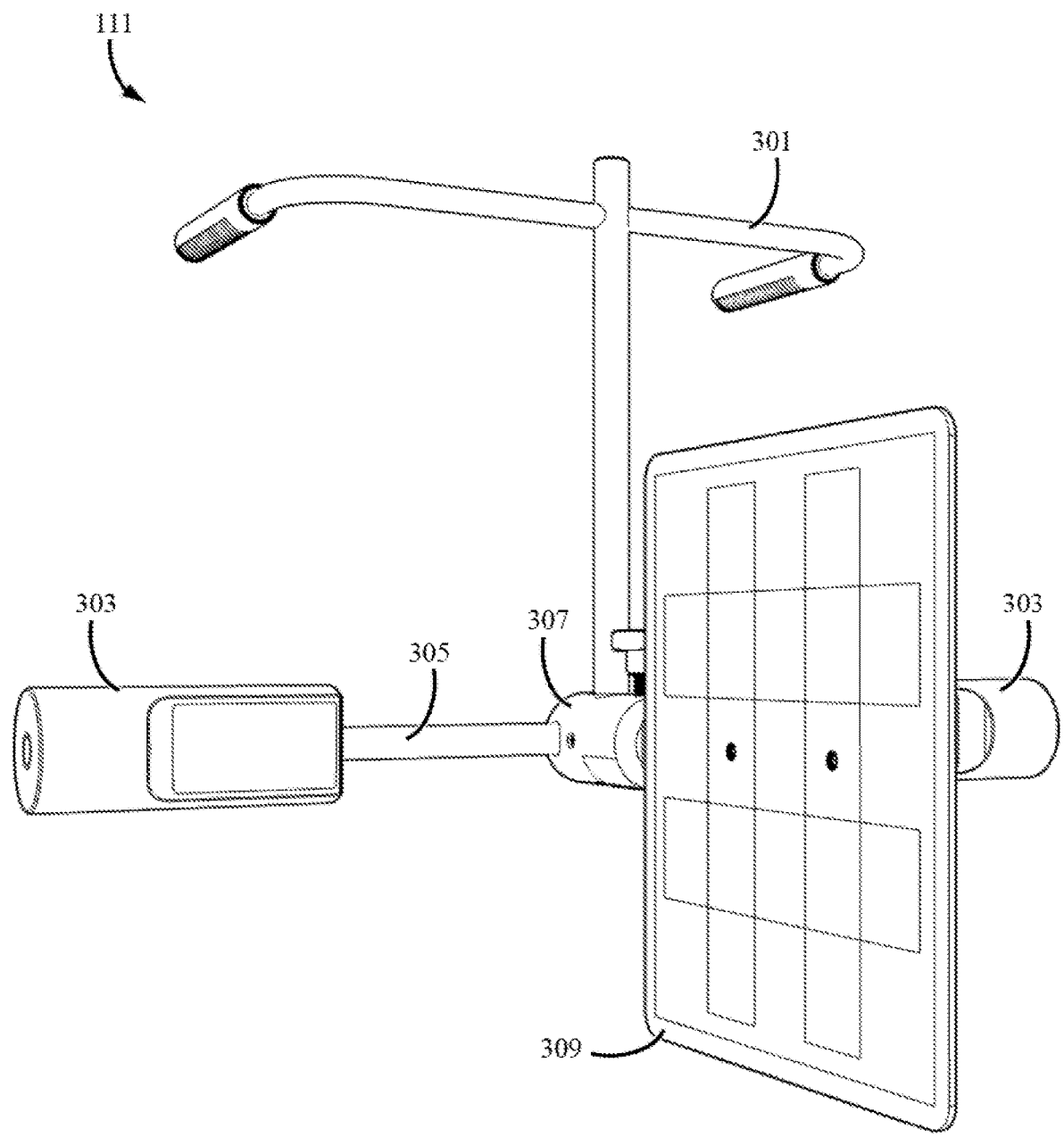
FIG. 3 is an illustration of a wheel-target structure of a calibration apparatus for an offset sensor of a vehicle.

FIG. 3 is an illustration of wheel-target structure 111. Wheel-target structure 111 comprises a mount handle 301 suitable for a user to carry or position the wheel-target structure 111 when not in use, but also suitable to suspend the wheel-target structure 111 over a wheel of a vehicle While setting up a calibration procedure. Wheel-target structure 111 additionally comprises a number of mount braces 303 connected to each other and to mount handle 301 via a brace tie 305. Mount braces 303 rest against the wheel or the vehicle itself to properly orient wheel-target structure 111 in a suitable position with respect to yaw, pitch, roll, and tilt to ensure that wheel-target structure 111 acts as a suitable reference while positioning reference structure 105 (not shown; see FIG. 1, FIG. 2). In the depicted embodiment, wheel-target structure 111 additionally comprises a height adjustment mechanism 307 operable to configure the wheel-target structure 111 such that it is compatible with a variety of wheels of different sizes and configurations. When configured into a specified arrangement, wheel-target structure 111 is designed to position a wheel target 309 into a position suitable for use as a reference when positioning reference structure 105. In some embodiments, wheel target 309 may be detachable, and may be suitably replaced with an alternatively-configured wheel target 309 that is designed to be compatible with a different sensor model, vehicle model, or a different particular reference locus. Some embodiments of the calibration apparatus will utilize two or more wheel-target structures 111 without deviating from the teachings disclosed herein. Some embodiments of the calibration apparatus will not utilize a wheel-target structure 111 without deviating from the teachings disclosed herein.

Figure 4:
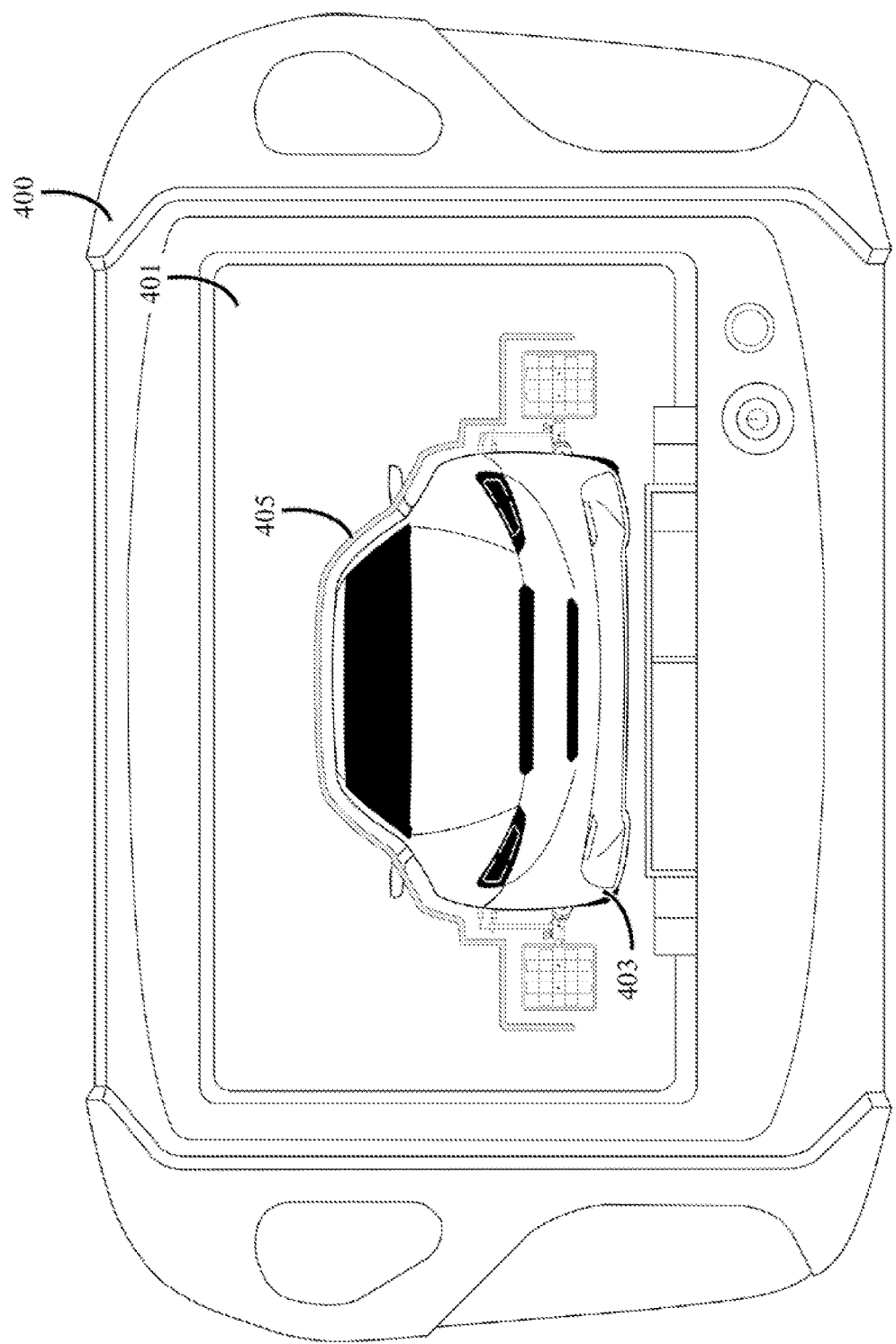
FIG. 4 is an illustration of a diagnostic device illustrating image data on a display along with a silhouette reference template.

FIG. 4 is a depiction of a diagnostic device 400 in data communication with camera 109 of an associated reference structure 105 (not shown; see FIG. 1, FIG. 2). Some embodiments may additionally be in data communication with secondary cameras 209 without deviating from the teachings disclosed herein. Diagnostic device 400 comprises a display 401 that displays image data 403 generated by the associated camera in real time. In the depicted embodiment, the image data 403 depicts a subject vehicle (such as vehicle 100; see FIG. 1) arranged with a pair of wheel-target structures 111 (see FIG. 3). Also displayed is a reference template 405 depicting an expected aspect of the image data to be observed when the associated reference structure 105 has been properly positioned at the reference locus. In the depicted embodiment, the reference template 405 comprises a silhouette reference template depicting an upper silhouette of the vehicle and the wheel-target structures, but other embodiments may comprise other reference templates. Other embodiments having different reference templates may comprise full depictions of the vehicle, partial depictions of the vehicle, an arrangement of symbols on the display, an active positional/direction indicator guiding a user as to how to move reference structure 105, or any other displayable reference template known to one of ordinary skill in the art without deviating from the teachings disclosed herein. In some embodiments, diagnostic device 400 may be mounted to a designated placement (not shown) on reference structure 105 in order to optimize the ergonomics of placement. For example, diagnostic device 400 may be mounted to a placement position on the side of reference structure 105 opposite camera 109 so that a user may watch the display 401 in real time while positioning the reference structure 105 without interfering with the image data generated by camera 109. In the depicted embodiment, diagnostic device 400 comprises a tablet processing device having a processor (not shown) and a touchscreen display 401. In some embodiments, diagnostic device 400 may comprise a smartphone, portable computing device, wearable computing device, or specialized camera display without deviating from the teachings disclosed herein. In some embodiments, diagnostic device 400 may comprise additional user input and output functions, such as auditory or haptic controls or output components, without deviating from the teachings disclosed herein.

Diagnostic device 400 may comprise a memory (not shown) storing thereon a plurality of reference templates to advantageously improve compatibility of the calibration apparatus with a variety of models of sensor or models of vehicle. In some such embodiments, multiple reference templates having different display configurations—such as a silhouette reference template as well as a full-image reference template—may be provided for a single configuration of a subject vehicle in order to accommodate user display preferences. In some embodiments, additional reference templates may be accessed from external storage, from a network connection, from an Internet connection, or from a cloud-based storage device without deviating from the teachings disclosed herein. Accessing additional, reference templates from external locations advantageously improves the usability of diagnostic device 400 by providing, compatibility with new and different models of sensor or vehicle as they become available. Access to these additional reference templates may be provided for a charge, such as a flat fee for external storage media or a subscription service for continued access to cloud storage.

Figure 5:
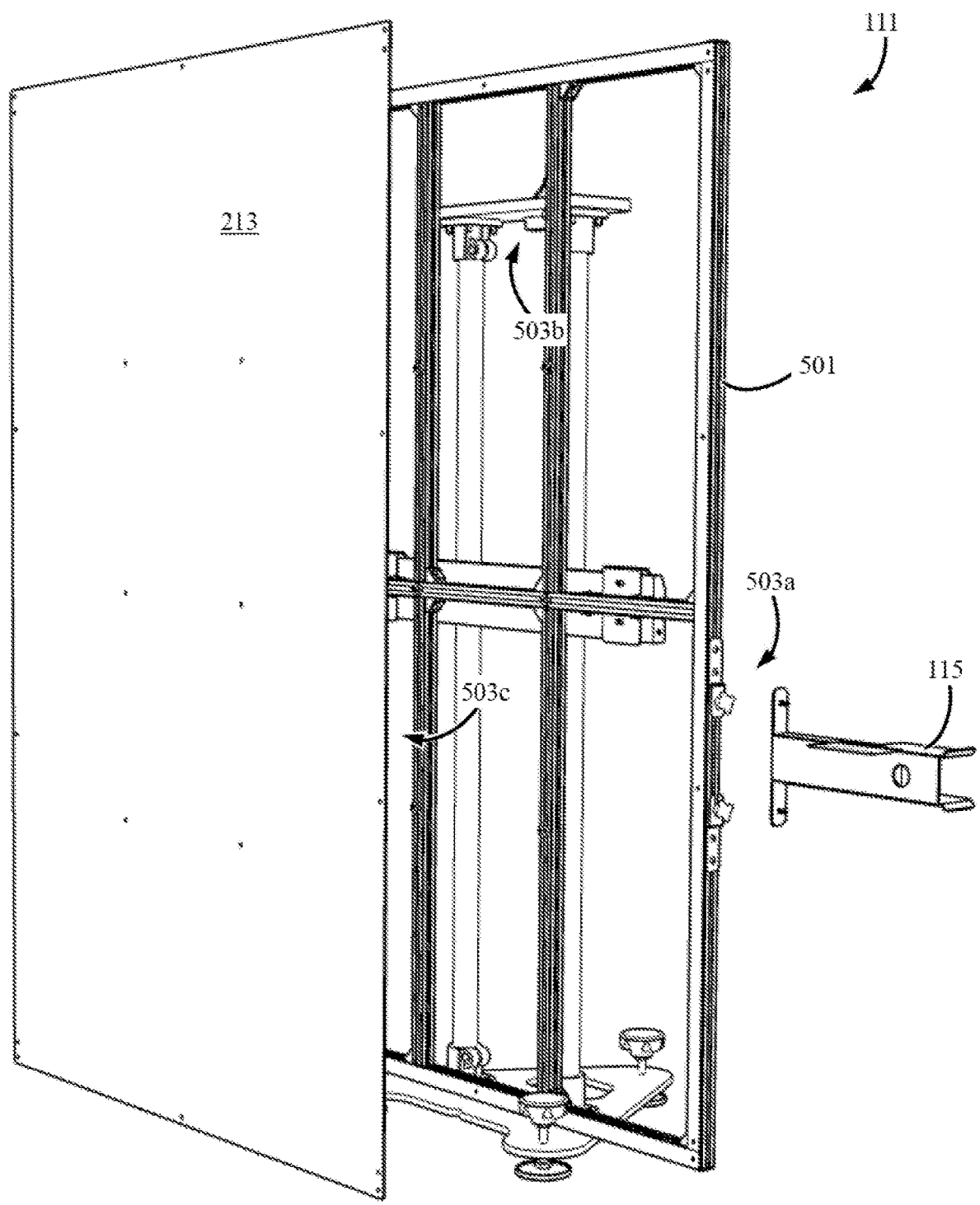
FIG. 5 is a view of a disassembled offset-target structure of a calibration apparatus for an offset sensor of a vehicle.

FIG. 5 depicts a disassembled view of offset-target structure 111. In this depiction, detachable target 213 has been removed from the target frame 501. It is additionally shown that guide aim 115 is configured to be detachably coupled to target frame 501 using a coupling placement 503. When guide arm 115 is coupled to coupling placement 503a it is in suitable location to interface with a horizontal member 107 of a reference structure 105 (see FIG. 1) for calibration of an offset sensor. However, this placement of guide arm 115 may not desired for portability or storage of the offset-target structure 111. When a more compact arrangement is desired, guide arm 115 may instead be detachably coupled to coupling placement 503b, located within target frame 501. Coupling placement 503b may advantageously provide a place to detachably couple guide arm 115 that is less awkward for storage or portability of the calibration apparatus. Though this depiction only presents two coupling placements 503, an additional coupling placement 503c is present on target frame 501 in a position that is horizontally symmetrical to coupling placement 503a. Some embodiments may comprise additional or different arrangements of coupling placements 503 without deviating from the teachings disclosed herein. Some embodiments may comprise fewer coupling placements 503 without deviating from the teachings disclosed herein. Some embodiments may comprise a guide arm 115 that may not be detached from target frame 501 without deviating from the teachings disclosed herein.

Figure 6:
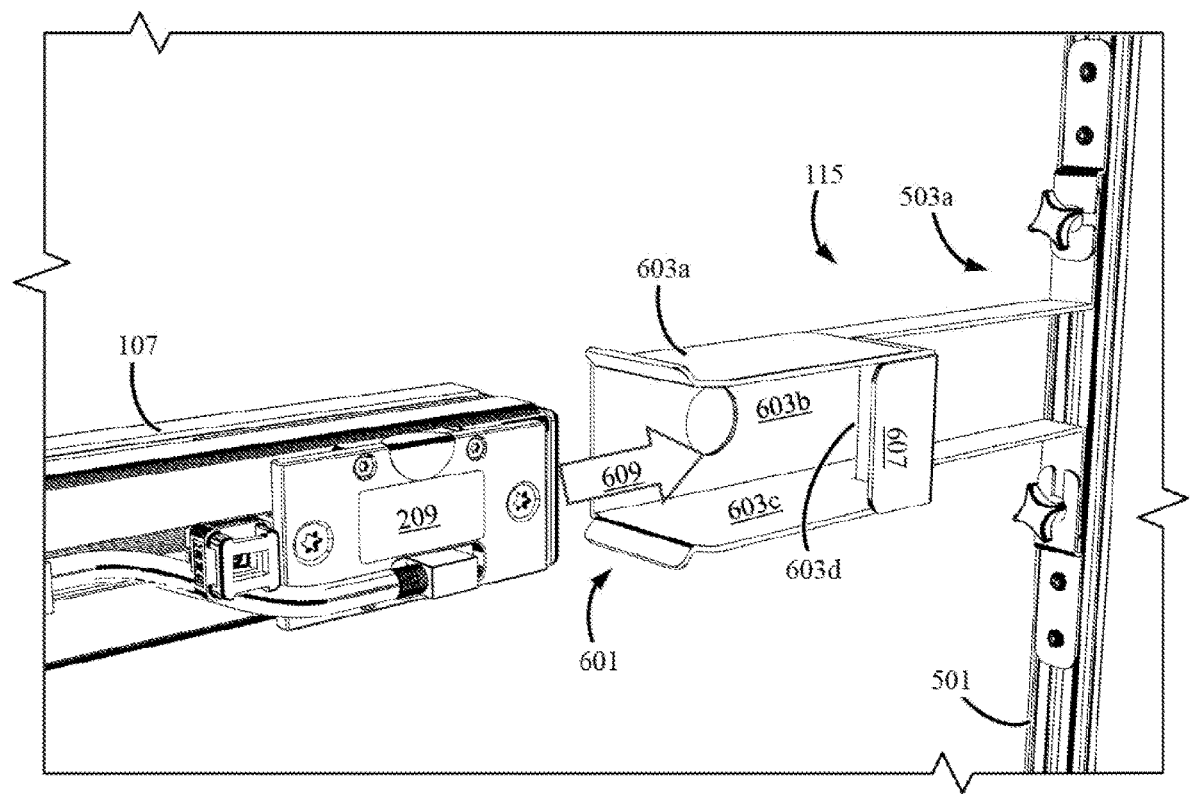
FIG. 6 is a closeup view of a guide arm and horizontal member of a calibration apparatus for an offset sensor of a vehicle.

FIG. 6 comprises a closeup illustration of the coupling components of the reference structure 105 (see FIG. 1; FIG. 2) and offset-target structure 113 (see FIG. 1; FIG. 2). Guide arm 115 comprises a sleeve 601 configured to receive a portion of horizontal member 107 moving in direction 609 during coupling. Sleeve 601 comprises a number of sleeve boundaries 603, and a guide arm retainer 607. Sleeve 601 is configured such horizontal member 107 fits snugly into sleeve 601. With a snug fit, the motion of both horizontal member 107 and guide arm 115 with respect to one another is restricted in linear directions. Sleeve boundaries 603a and 603b restrict the vertical displacement of the coupled components. Sleeve boundary 603d restricts the motion of the components with respect to direction 609. Sleeve boundary 603b and guide arm retainer 607 restrict the motion of the components with respect to a horizontal displacement in a direction perpendicular to direction 609. The coupling is made detachable because the components can be readily moved in a direction opposite of direction 609 when coupled.

Sleeve 601 is configured to restrict rotational movement of the coupled components, and in particular restriction rotational movement of offset-target structure 113. Sleeve boundaries 603a, 603b, and 603c, coordinating with guide arm retainer 607 restrict the pitch and roll of guide arm 115 when coupled with horizontal member 107. Sleeve boundary 603b and guide arm retainer 607 restrict the yaw displacement of the coupled components. The design of guide arm retainer 607 may be adjusted to restrict the yaw motion to a greater or lesser degree while still permitting a desired level of detachability between the components during coupling. In the depicted embodiment, guide arm retainer 607 retains horizontal member for approximately one-fourth the total length of sleeve 601, but other embodiments may have different configurations providing different levels of desired yaw restriction without deviating from the teachings disclosed herein. By way of example and not limitation, guide arm retainer 607 may comprise the entire length of sleeve 601 to maximize the ability of sleeve 601 to secure the coupling between horizontal member 107 and guide arm 115. Other ones of the number of sleeve boundaries 603 may comprise different configurations to optimize the desired security of sleeve 601. In some embodiments, sleeve 601 may comprise a latch, pin-and-loop-, lock, or other security mechanism to enhance the security of the interface between horizontal member 107 and guide aim 115 during detachable coupling without deviating from the teachings disclosed herein.

Because the position of offset-target structure 113 is determined based upon the coupling thereof to reference structure 105, the position of offset-target structure 113 is effectively rendered automatic by the coupling. Because the interface between horizontal member 107 and guide aim 115 restricts the angular and rotational placement of offset-target structure 113, the orientation of the offset-target structure 113 is also effectively rendered automatic by the coupling. In this regard, the calibration apparatus effectively renders a proper placement of the offset-target structure 113 entirely based upon the pre-existing work done to position reference structure 105 at its respective reference locus, thus saving additional measurements and placement determination for the additional structure. This setup saves time and efficiently permits a calibration for all sensors of a subject vehicle, including offset sensors.

Figure 7:
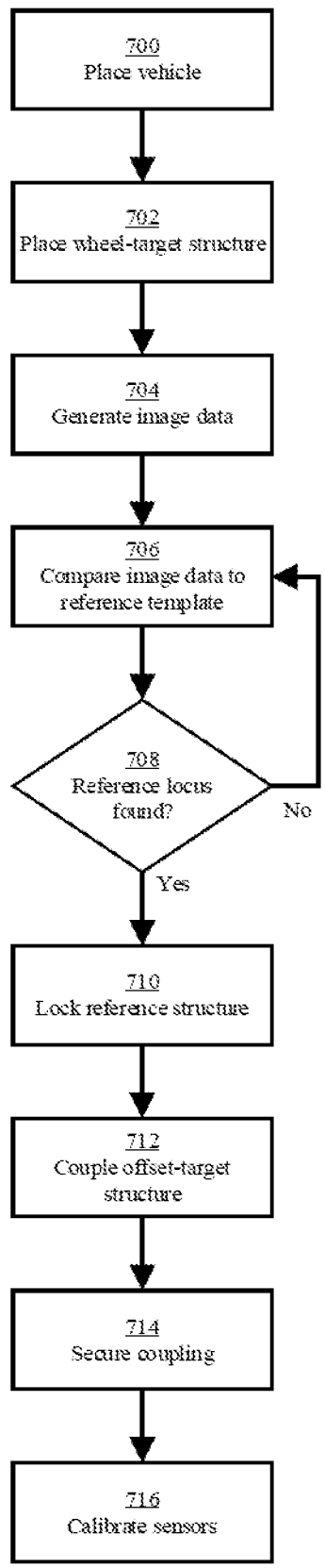
FIG. 7 is a flowchart of a method for arranging a calibration apparatus such that it is suitable for calibrating an offset sensor of a vehicle.

FIG. 7 is a flowchart depicting a method for setting up a calibration apparatus for calibrating an offset sensor of a subject vehicle. The method starts at step 700 by moving the subject vehicle into a space suitable for calibration that can accommodate the space required for placement of the calibration apparatus structures. In some embodiments, such as field implementations, this step may be omitted without deviating from the teachings disclosed herein.

Once the vehicle is determined to be in a suitable location for setup and calibration, the method proceeds to step 702, where a wheel-target structure is placed onto a wheel of the subject vehicle. In some embodiments using a calibration apparatus that does not rely upon a wheel-target structure, this step may be omitted without deviating from the teachings disclosed herein.

Once the vehicle is fully-prepared, a camera associated with a reference structure is activated, and the camera is used to generate image data depicting the subject vehicle in step 704. The image data is compared on a display to a reference template indicating an expected set of image data when the reference structure is properly positioned at a reference locus specified for the make model of the subject vehicle or the associated sensor intended for a calibration. The display is updated in real-time as the reference structure is moved around in step 706 to find the reference locus. At step 708, a comparison is made between the active image data and the reference template to determine if the reference structure has been positioned at the reference locus. If not, the method continues in a loop back to step 706 as the reference structure continues being repositioned. Once the reference locus is successfully found, the method continues to step 710, where the position of the reference structure is locked into place. In some embodiments wherein the calibration apparatus does not comprise a mechanism to lock the position of the reference structure, this step may be omitted without deviating from the teachings disclosed herein.

After the reference structure is positioned appropriately, the method proceeds to step 712 where an offset-target structure is coupled to the reference structure. By way of example, and not limitation, the offset-target structure couples to the reference structure by utilizing a guide arm that is designed to automatically position the offset-target structure in a locus suitable for calibration of an associated offset sensor of the subject vehicle. In such an embodiment, the guide arm may restrict motion of the offset-target structure with respect to the reference structure (and by proxy, with respect to the reference locus) such that an appropriate placement and orientation of the offset-target structure is achieved by way of the coupling.

Once coupled, the method may proceed to step 714, where the coupling of the offset-target structure to the reference structure may be secured. In some embodiments, this step may be omitted without deviating from the teachings disclosed herein.

Once the offset-target structure has been appropriately positioned by way of coupling, the calibration apparatus has been setup appropriately, and the method may continue to step 716 where the sensors are calibrated. In some embodiments, only the offset sensors may be calibrated at step 716, and other sensors not affiliated with the offset-target structure may be calibrated at an earlier stage in the method after step 708 without deviating from the teachings disclosed herein.

In some embodiments, the configuration of the calibration apparatus may necessitate additional intermediary steps not depicted in this embodiment without deviating from the teachings disclosed herein. Such intermediary steps may comprise attachment of a detachable target to the wheel-target structure, reference structure, or offset-target structure. Such intermediary steps may comprise placement of the guide arm to a particular coupling placement on the offset-target structure. Such intermediary steps may comprise configuration or arrangement of the components of the wheel-target structure, reference structure, or offset-target structure. Such intermediary steps may comprise setup of the display to properly reflect a particular combination of vehicle model and sensor model(s) intended for calibration. Other steps of the method may be present without deviating from the teachings disclosed herein.

While exemplary embodiments, are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:
1. A calibration apparatus for an offset sensor of a subject vehicle, the apparatus comprising:
  a reference structure having a horizontal member, the horizontal member disposed in a direction parallel with a horizontal plane;

a camera configured to be coupled to the reference structure and operable to generate image data depicting the subject vehicle; and an offset-target structure having a guide arm and configured to be detachably coupled to the horizontal member such that the guide arm interfaces with the horizontal member, wherein the calibration apparatus is configured for a calibration procedure of the offset sensor when the reference structure is positioned relative to the subject vehicle based upon image data generated by the camera and the offset-target structure is coupled to the horizontal member.

2. The calibration apparatus of claim 1, wherein the guide arm restricts the movement of the offset-target structure while the offset-target structure is coupled to the horizontal member.

3. The calibration apparatus of claim 1, wherein the guide arm restricts the pitch, yaw, or roll of the offset-target structure while the offset-target structure is coupled to the horizontal member.

4. The calibration apparatus of claim 1, wherein the guide arm restricts the pitch, yaw, and roll of the offset-target structure while the offset-target structure is coupled to the guide arm.

5. The calibration apparatus of claim 1, wherein the guide arm comprises a sleeve configured to receive a portion of the horizontal member when the guide arm interfaces with the horizontal member.

6. The calibration apparatus of claim 1, wherein the guide arm further comprises a retainer, the retainer configured to secure the guide arm and the horizontal member during coupling.

7. The calibration apparatus of claim 1, wherein the guide arm is configured to be detachably coupled to a number of coupling placements of the offset-target structure, the coupling placements comprising at least a first position suitable for coupling the offset-target structure to the horizontal member and a second position suitable for storing the guide arm.

8. The calibration apparatus of claim 1, further comprising a processor in data communication with the camera, the processor configured to compare a silhouette reference template in comparison with the image data and output guidance for placement of the reference structure with respect to the subject vehicle.

9. The calibration apparatus of claim 1, wherein the offset-target structure further comprises a detachable target.

10. The calibration apparatus of claim 9, wherein the detachable target comprises a vinyl mat target.

11. A method for placing an offset-target structure into a locus suitable for calibration of an offset sensor of a subject vehicle, the offset-target structure having a guide arm, the method comprising:

positioning a reference structure into a reference locus, the reference structure having a horizontal member and a camera, the reference locus defined in relation to the vehicle and found using image data generated by the camera depicting the subject vehicle; and coupling the offset-target structure to the reference structure such that the guide arm interfaces with the horizontal member, wherein the reference locus is found using image data generated by the camera and wherein the guide arm restricts the motion of the offset-target structure with respect to pitch, yaw, or roll when the offset-target structure is coupled to the reference structure.

12. The method of claim 11, wherein the guide arm comprises a sleeve, and the guide arm interfaces with the horizontal member by receiving a portion of the horizontal member within the sleeve.

13. The method of claim 12, wherein the guide arm further comprises a retainer, and wherein coupling the offset-target structure to the reference structure comprises the retainer securing the portion of the horizontal member received by the sleeve.

14. The method of claim 11, wherein the step of positioning the reference structure further comprises:

generating the image data using the camera;

outputting the image data to a display; and positioning the reference structure such that the image data on the display is aligned with a silhouette reference template superimposed on the display, the silhouette reference template illustrating expected image data generated when the reference structure is positioned at the reference locus.

15. The method of claim 11, further comprising coupling a detachable target to the offset-target structure, the detachable target having a design specified for calibration of the offset sensor.

16. The method of claim 11, wherein the coupling restricts the motion of the offset-target structure with respect to pitch, yaw, and roll.

* * * * *